United States Patent [11] 3,591,201

| [72] | Inventors | Darrell S. Brawn<br>Livonia;<br>Bogdan Lisowsky, Detroit, both of, Mich. |
|---|---|---|
| [21] | Appl. No. | 814,639 |
| [22] | Filed | Apr. 9, 1969 |
| [45] | Patented | July 6, 1971 |
| [73] | Assignee | Eaton Yale & Towne Inc.<br>Cleveland, Ohio |

[54] VEHICLE SAFETY APPARATUS
15 Claims, 6 Drawing Figs.

[52] U.S. Cl. ................................................. 280/150
[51] Int. Cl. ................................................. B60r 21/00
[50] Field of Search ..................................... 280/150 AB

[56] References Cited
UNITED STATES PATENTS

| 3,414,292 | 12/1968 | Oldberg et al. | 280/150 |
| 3,451,694 | 6/1969 | Hass | 280/250 |
| 3,476,402 | 11/1969 | Wilfert | 280/150 |

FOREIGN PATENTS

| 953,312 | 3/1964 | Great Britain | 280/150 |

*Primary Examiner*—Kenneth H. Betts
*Attorney*—Yount, Flynn & Tarolli

ABSTRACT: A vehicle safety apparatus includes a confinement which has a collapsed inoperative condition and an expanded operative condition. The confinement is expanded by directing fluid therein, and when expanded has a substantially uniform pressure throughout. The confinement has a first portion engageable with the head of the occupant and a second portion engageable with the torso of the occupant to apply a restraining force to these respective portions of the occupant during the occurrence of an accident. Means are provided for minimizing the membrane stress in the first portion of the confinement so as to minimize bending of the occupant's head backward relative to his torso.

INVENTORS
DARRELL S. BRAWN
BOGDAN LISOWSKY
BY Young, Flynn & Tarolli
ATTORNEYS

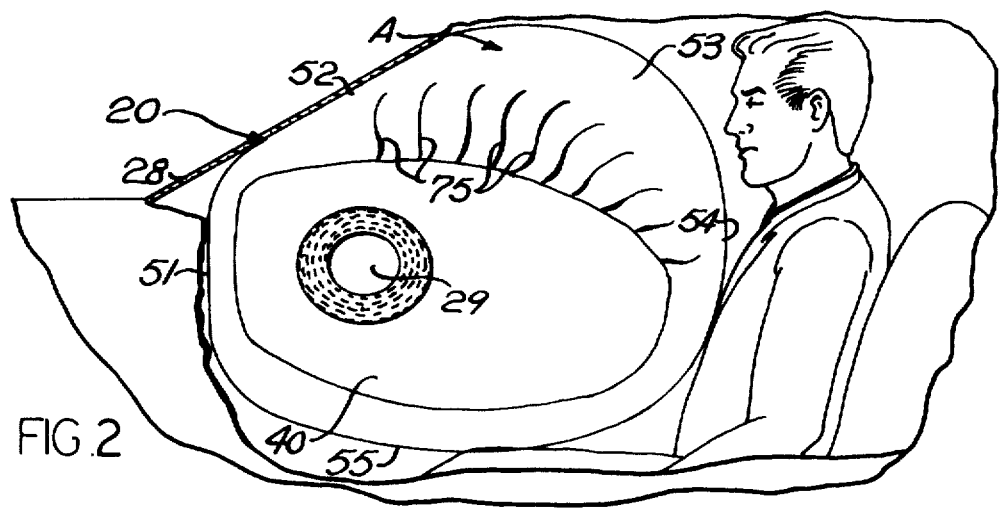
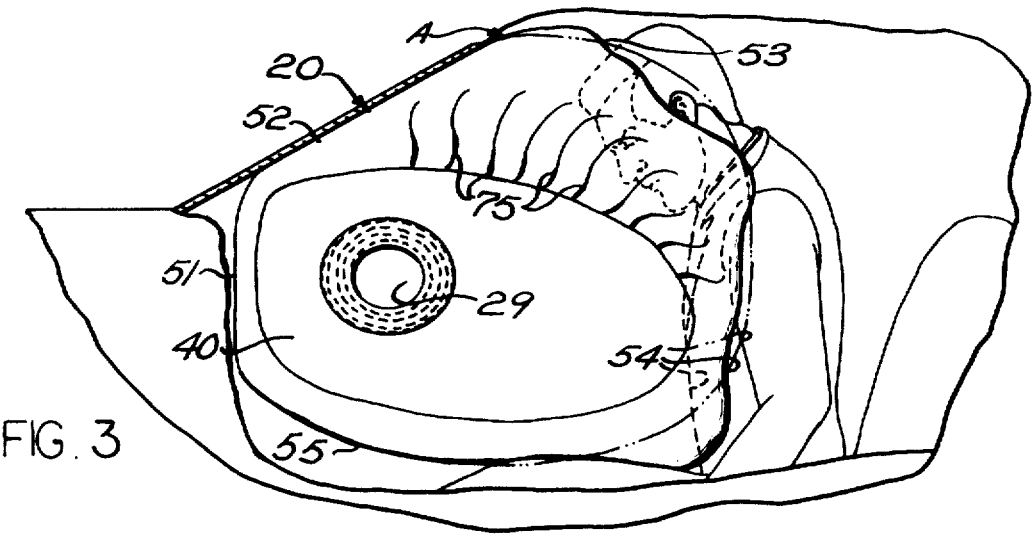
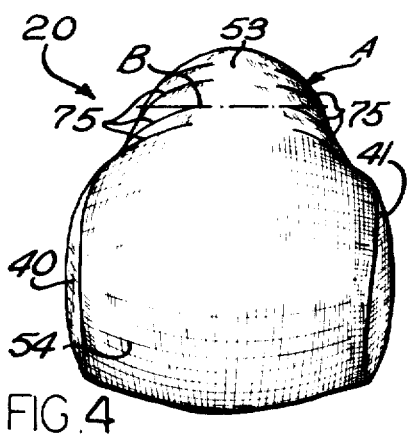
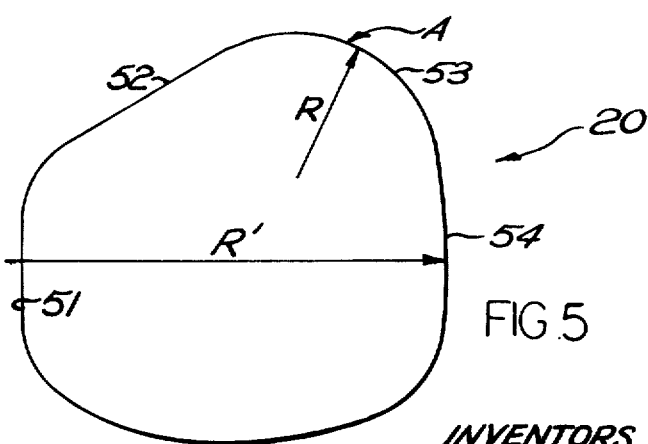

VEHICLE SAFETY APPARATUS

The present invention relates to a vehicle safety apparatus which includes a confinement which has a collapsed inoperative condition and an expanded operative condition for restraining movement of the occupant of a vehicle during an accident, and particularly relates to a confinement having a portion thereof which is operable to provide a soft-restraining force to the head of the occupant.

Expandable confinements for restraining movement of an occupant of a vehicle during an accident are known. Certain difficulties have been encountered in the design of such confinements to properly restrain both the head and torso of the occupant. These difficulties center around an amplification of effective area to mass ratio due to membrane stresses within the expanded confinement, the effective area being that area the mass tends to assume, or sweep, as it enters the confinement. This amplification of effective area due to membrane stresses is a complex function of confinement geometry, geometry of the entering object, and its displacement relative to the confinement. In general, for objects of approximately equal shapes and densities (such as the head and torso of a vehicle occupant) entering a similarly shaped confinement, a substantially greater effective area to mass ratio is obtained for the smaller mass object. Thus, the head would be arrested more rapidly than the torso and would move rearward relative to the torso. In order to minimize the possibilities of injury to the neck and the area adjacent thereto, relative motion of the head and torso should be minimized. Known safety apparatus designs are not believed completely effective to properly restrain the torso and, at the same time, minimize the possibility of injury due to backward movement of the head relative to the torso. One specific effort to minimize backward movement of the head relative to the torso is disclosed in application, Ser. No. 735,699 filed June 10, 1968 assigned to the assignee of the present invention.

It has been discovered that the head and the torso of the occupant of the vehicle can be restrained in a manner minimizing injurious relative movement therebetween. This is effected by restraining the head with a portion of the confinement that is collapsible to a greater extent due to a given force than the portion of the confinement which restrains the torso. In other words, a relatively soft portion of the confinement is provided to restrain the head of the occupant. Even though a relatively soft portion of the confinement is provided for the head to impact therewith, the design of the confinement is such that the restraint of the torso is not compromised.

More specifically, it has been discovered that by reducing the membrane stresses in a particular portion of the confinement, the restraining force applied by that portion on a given body having a given area and weight can be reduced. Thus, by reducing the membrane stresses in the portion of the confinement with which the head of the occupant impacts a softer restraining force can be provided for the head without compromising the restraint of the torso.

Accordingly, an object of the present invention is to provide a new and improved vehicle safety apparatus which includes a confinement for restraining movement of an occupant of a vehicle during the occurrence of an accident and wherein the confinement is constructed so that the head of the occupant impacts with a portion of the confinement which restrains the head and minimizes the tendency of the head of the occupant to bend backwardly relative to the torso of the occupant, thus minimizing the possibility of injury to the neck of the occupant.

A further object of the present invention is the provision of a new and improved safety apparatus which includes a confinement having first and second portions thereof operable to restrain movement of an occupant of the vehicle during an accident, the first portion thereof being operable to restrain the head of the occupant and the second portion being operable to restrain the torso of the occupant, and wherein the first portion is operable to apply a lower restraining force to a given body of approximately head size moving against the confinement with a given force than the second portion applies to that body moving against the confinement with the same force.

A still further object of the present invention is the provision of a new and improved safety apparatus which includes a confinement operable to restrain movement of an occupant of the vehicle during and accident, and wherein the portion of the confinement which engages and restrains movement of the head of the occupant includes material in excess of that necessary to extend between the boundaries of that portion of the confinement prior to expansion thereof and thereby operates to minimize the membrane stress in that portion of the confinement which engages the head of the occupant.

Another object of the present invention is to provide a new and improved safety apparatus, as noted in the next preceding paragraph, wherein the portion of the confinement which restrains the head of the occupant includes pleated material operable to minimize membrane stresses in that portion of the confinement to thereby provide a soft restraining force for the head of the occupant and thus minimize rebound of the occupant's head from the confinement upon impact therewith.

Further objects and advantages of the present invention will be apparent to those skilled in the art to which it relates from a detailed description of a preferred embodiment thereof which is made in connection with the accompanying drawing in which:

FIG. 2 is a side elevational view of the confinement in an expanded condition;

FIG. 3 is a side elevational view of the confinement illustrated in FIG. 2 and showing the occupant impacting with the confinement;

FIG. 4 is a front elevational view of the confinement taken along the lines 4—4 of FIG. 1;

FIG. 5 is a schematic side view of the confinement when expanded; and

FIG. 6 is an enlarged fragmentary view showing a portion of the confinement of FIG. 1.

Figure 1:
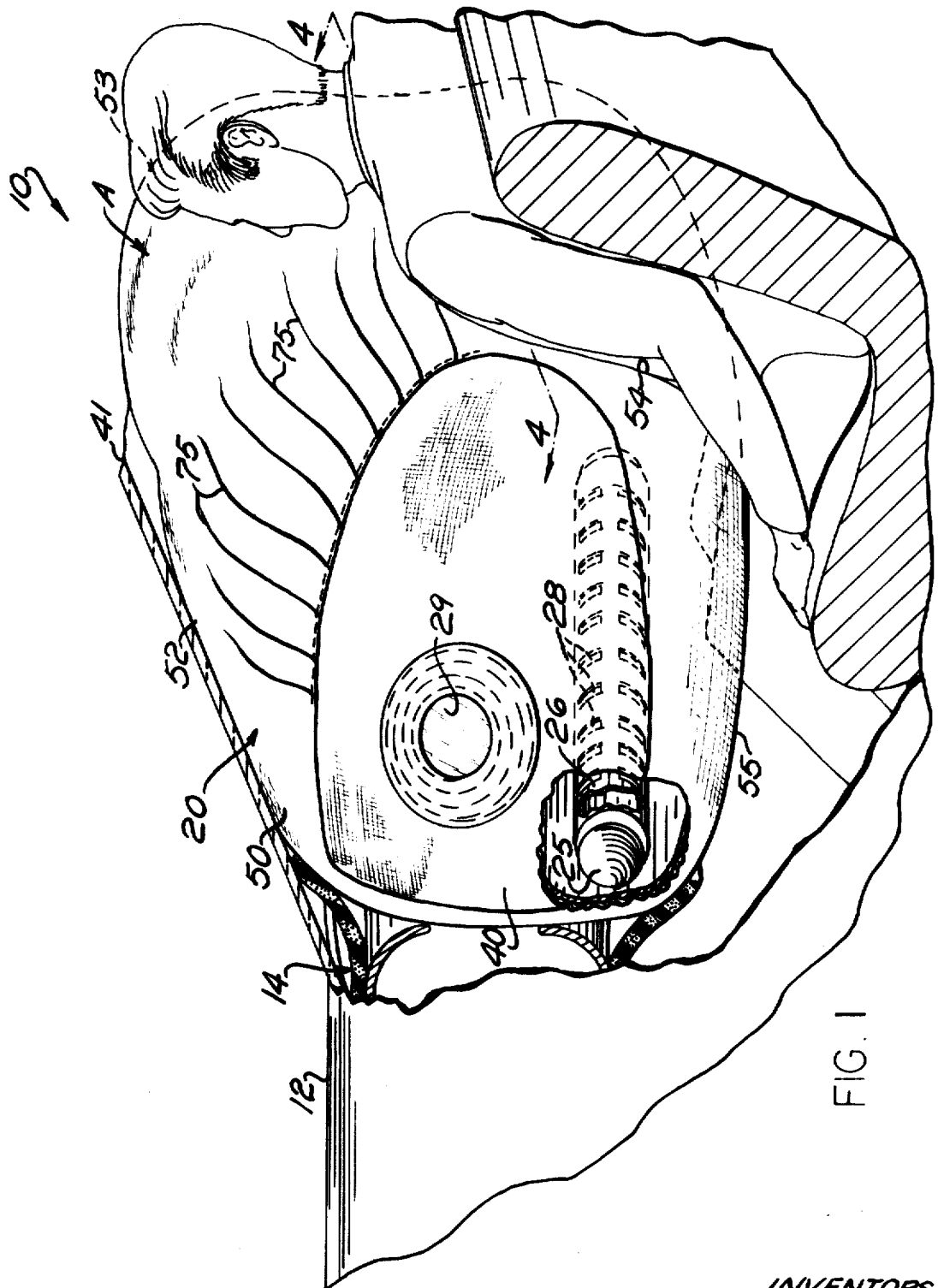
FIG. 1 is a schematic perspective view of a safety apparatus having an expandable confinement embodying the present invention and disposed in an automotive vehicle.

The present invention provides a new and improved safety apparatus of the type which includes a confinement which has a collapsed inoperative condition and an expanded operative condition. The safety apparatus of the present invention when in its operative condition is capable of restraining movement of an occupant of a vehicle as a result of an accident. In view of the fact that the safety apparatus restrains the movement of the occupant as a result of an accident, the possibility of injury to the occupant is minimized, due to the fact that the occupant will not forcefully strike a structural part of the vehicle. The preferred embodiment of the confinement constructed in accordance with the present invention is extremely capable of effectively restraining and cushioning the head of the occupant during an accident and thus minimizes the possibilities of injury to the neck of the occupant. The vehicle safety apparatus embodying the present invention may be utilized with vehicles of many different types, such as automobiles, airplanes, and trucks.

As representing the preferred embodiment of the present invention, FIG. 1 of the drawings illustrates a safety apparatus 10 disposed in an automotive vehicle 12. The safety apparatus 10 may be associated with different parts of the automotive vehicle and may be mounted in the back of the front seat of the vehicle, or in various locations in the vehicle. As illustrated, the safety apparatus 10 is located in association with the dashboard 14 of the vehicle 12.

The safety apparatus 10 is of the type which includes a confinement 20 which has a collapsed or contracted condition, not shown, and an expanded condition illustrated in FIG. 1. The confinement when in its contracted collapsed condition is located in the dashboard of the vehicle and suitably hidden from view, as described in copending application, Ser. No. 789,744 filed Jan. 8, 1969. The confinement is expanded from its collapsed condition to its operative expanded condition by the flow of fluid into the confinement and when in its expanded condition restrains movement of an occupant of a vehicle relative to the vehicle during the occurrence of an accident.

The safety apparatus 10 includes means for expanding the confinement 20. The means for expanding the confinement is operable to provide a fluid flow which is directed into the confinement to effect the expansion thereof. This means includes a suitable source of fluid located, in the illustrated embodiment, within the confinement 20. A diffuser member 26 is associated with the source of fluid and is operable to diffuse and direct the fluid into the confinement 20. The source of fluid may take many different forms and could be a gas generating material which is operable to generate gas when actuated, or a container of gas stored under high pressure. In the illustrated embodiment, a container or reservoir 25 of gas stored under high pressure comprises the source of fluid for expanding the confinement. The diffuser member 26, as disclosed in application, Ser. No. 621,845, now U.S. Pat. No. 3,411,807, assigned to the assignee of the present invention, is associated with the container or reservoir 25 of gas and is operable to direct and distribute the flow of fluid from the reservoir 25 into the confinement 20. It should be obvious that the diffuser member has a plurality of openings 28 therein which control the distribution of the fluid as it flows from the reservoir 25 to the confinement 20.

The reservoir 25 comprises a closed container having an explosive means associated therewith. The explosive means is operable upon actuation thereof to rupture or open the reservoir 25 to effect fluid flow from the reservoir 25 to the confinement 20. The explosive means may be in the form of a removable or replaceable plug which is threadedly engaged in the end of the reservoir 25, such as disclosed in Ekstrom application, Ser. No. 730,024 filed May 17, 1968, assigned to the assignee of the present application. A sensor device, such as disclosed in application, Ser. No. 753,946 filed Aug. 20, 1968, assigned to the assignee of the present application, not illustrated, is operable to sense the occurrence of an accident and complete a circuit to actuate the explosive means. Actuation of the explosive results in the formation of an opening in the closed fluid reservoir 25 and the fluid stored under high pressure therein flows through the opening, through the diffuser member 26 and into the confinement 20 to effect expansion thereof.

Therefore, it should be apparent from the above that when the vehicle encounters an accident condition, as sensed by a suitable sensor, a circuit is completed for activating the explosive plug which opens the reservoir 25 and effects the flow of fluid from the reservoir through the diffuser and into the confinement, effecting a rapid inflation of the confinement. The confinement is inflated in such a manner that movement of the occupant is restrained as a result of the accident.

The confinement 20, as illustrated in the drawings, is made of a pair of side panels 40, 41 which extend substantially transverse to the dashboard 14 of the vehicle when the confinement is expanded. The side panels are of a similar shape and construction. The confinement is completed by material which is sewn to the side panels 40, 41 and which material is generally designated 50 in the drawings. The material 50, of course, extends between the side panels 40, 41 and at its side edges is suitably secured to the side panels 40, 41. When the confinement is expanded, it may be said to have five surfaces, designated 51, 52, 53, 54 and 55 in addition to the side panels 40, 41. When the confinement is expanded, the surface 51 is located immediately adjacent the dashboard and engages the dashboard, while the surface 52 extends at an angle to the surface 51 so as to engage the windshield 28 of the vehicle upon expansion. The surface 53 extends toward the occupant from the surface 52 and will be described in greater detail hereinbelow and operates to control and restrain movement of the head of the occupant. The surface 54 is operable to restrain the torso of the occupant, while the surface 55 engages the legs of the occupant and may be termed the bottom of the confinement. These various surfaces are illustrated in FIGS. 2 and 3 in their operative positions. It should be apparent that, while for purposes of description the confinement is defined as having distinct surfaces, in reality when the confinement is inflated these surfaces tend to merge and give the confinement a generally spherical appearance.

Blowout patches 29 are disposed in the side panels 40, 41 of the confinement 20. The blowout patches are operable to relieve the fluid pressure in the confinement 20 when the pressure rises to a predetermined level upon impact of the occupant with the confinement 20. When the occupant impacts with the confinement, the blowout patches 29 will rupture to relieve the pressure in the confinement and thereby minimize the possibility of the occupant's rebounding from the confinement.

As noted hereinabove, when the confinement 20 is inflated the portion of the confinement which has been described as surfaces 54 engages the torso of the occupant and effects a restraint on the torso of the occupant in order to restrain or control movement of the occupant relative to the vehicle. The portion 53 of the confinement engages the head of the occupant and restrains or cushions the head of the occupant with a soft force which allows the head to move into the confinement rather than impacting and rebounding substantially therefrom. This minimizes the possibility of the head moving backwardly relative to the torso of the occupant which may result in injury to the neck of the occupant. The construction of the portion 53 of the confinement is such as to provide a very soft cushioning effect on the head of the occupant and is large enough so that it is operable to effectively cushion the head of occupants of various sizes.

In the illustrated embodiment, the surface 53 of the confinement prior to expansion thereof may be said to be defined by boundaries. The material 50 extends between these boundaries and forms the surface portion 53. The area of the material 50 that extends between the boundaries is larger than the area defined by the boundaries so that an excess of material 50 is provided for defining the surface portion 53 of the confinement 20. This excess material is operable to minimize the membrane stresses in the portion 53 of the confinement which operates to restrain the head of the occupant, as will be described hereinbelow. The excess material is provided in the illustrated embodiment by pleats 75 which are formed in the material 50 by folding the material on itself a plurality of times and then sewing the material to the side panels 40, 41. Such pleats are illustrated in FIG. 6 and when the confinement is not inflated, extend throughout the surface portion 53. The pleats are thus permanently formed in the material and do not, upon inflation of the confinement, completely disappear adjacent the side panels 40, 41. However, the pleats are unfolded in the central area of the confinement when it is expanded as shown in FIGS. 1 and 4. Due to the fact that the pleats are formed on the surface portion 53 of the confinement, this results in an excess of material being provided on the portion of the confinement which is to engage the head of the occupant to restrain movement thereof. While pleats are used to provide the excess material in the illustrated embodiment, the excess material could be provided in other forms to minimize the membrane stress in the portion of the confinement which restrains the head.

When the confinement 20 is expanded, the excess material tends to bubble up or bulge out, as illustrated at A. The dimension of the bulge A measured in the direction parallel to the dashboard, as indicated at B in FIG. 4, is less than the dimension of the surface 54 measured in the same direction. The pleats, when the confinement is expanded, tend to unfold. However, they do not completely disappear due to their being stitched to the side panels 40, 41, as noted above.

The bulged-out portion A of the confinement 20 has a substantially lower membrane stress than the portion of the confinement which is to engage the torso of the occupant, even though the pressure in all portions of the confinement is substantially uniform. The membrane stress in any material of the confinement is, of course, proportional to the pressure and the radius of the given material. In other words, as the radius of a particular portion of the material increases, the membrane stresses in that material will likewise increase, assuming the pressure remains constant. Conversely, as the radius of the portion of the material decreases, the membrane stresses in that portion of the material will decrease if the pressure does not vary.

By providing the extra material in the portion 53 of the confinement, the membrane stresses are minimized in that portion. This results due to the fact that the extra material in the surface 53 minimizes the radius R, see FIG. 5 for a schematic representation thereof, when the confinement is expanded. The radius R is relatively small as compared to radius R' for the surface 54. Accordingly, the membrane stress in the surface 53 is substantially smaller than in the surface 54. While the surfaces 53, 54 are referred to as having radii, these surfaces are not circular and thus have a variable radius. However, for purposes of description, they can be thought of as having a single radius.

By providing lower membrane stresses in the surface 53, the effective restraining force applied thereby to a given body of approximately head size which engages the confinement with a given force will be lower than that applied to the same body engaging the portion 54 with the same force. The construction is such that the portion 53 will apply a restraining force to such a body which is one quarter to three quarters the restraining force applied to the body by the portion 54. The restraining force which is applied to the head and torso of the occupant as a result of engagement with the confinement is equal to the area thereof times the pressure in the bag, times a factor which is, in effect, due to the membrane stress in the material. The membrane stress in the material may be considered to increase the restraining force by a factor which could be considered as an effective increase in the area of the confinement which engages the occupant. In other words, the greater the membrane stress in a portion of the confinement, the greater the effective area of contact between the occupant and the confinement even though the actual area would be the same regardless of membrane stresses.

Accordingly, the addition of material to effect a smaller radius in the surface 53 of the confinement formed by the pleats 75 provides an area of minimized membrane stresses in the confinement and as a result, the restraining force applied by surface 53 to a given body impacting thereagainst with a given force would be lower than the restraining force applied by surface 54 to the same body moving with the same force.

It should be obvious that the head of the occupant has a substantially smaller mass and a substantially smaller surface area than the occupant's torso and further that when the occupant impacts with the confinement 20, the momentum of the head is much smaller than the momentum of the torso due to the difference in mass. By minimizing the membrane stress in the portion 53 of the confinement, a soft cushioning restraining force can be applied to the head of the occupant to minimize rebound from the portion 53 of the confinement 20. In fact, the membrane stress in the portion 53 can be controlled to such an extent that the head of the occupant moves into the confinement 20 along with the torso, as shown in FIG. 3. As a result, the torso does not move forwardly relative to the head. Thus, the possibility of neck injuries resulting therefrom are minimized. Moreover, it should be obvious that the minimizing of the membrane stress in portion 53 of the confinement does not affect the restraining force with which portion 54 restrains the torso of the occupant. Therefore, the desired result, that the head of the occupant be restrained with a soft cushioning force, is achieved without compromising the restraint of the torso of the occupant.

It should be apparent that upon the occurrence of an accident, the confinement 20 will be expanded and disposed in a position to restrain movement of the occupant prior to movement of the occupant due to the forces of the accident as illustrated in FIG. 2. The occupant then moves toward and impacts the expanded confinement. The torso of the occupant is restrained by the surface portion 54 of the confinement and the head is restrained by the portion 53 of the confinement. Because the portion 53 of the confinement has pleats disposed therein, minimizing the membrane stress in that portion of the confinement, the head readily moves into the portion 53 as opposed to rebounding from the confinement. Not only does the head not rebound from the confinement 20, but also it continues to move into the confinement 20 as the torso moves into the confinement. Thus, the torso does not move ahead of the occupant's head which, of course, would result in a backward bending of the head in substantially the same manner as if rebound of the head had occurred. In other words, upon impact of the occupant with the confinement, the possibility of relative movement of the head of the occupant in a direction backwards relative to the torso will be minimized. Therefore, the possibility of injuries to the neck region of the occupant are minimized.

While the illustrated embodiment of the present invention utilizes excess material to provide the lower membrane stresses in the portion 53 of the confinement, other constructions not involving excess material could also be used to provide the lower membrane stresses. The confinement could be made of dissimilar materials. In particular, the material which forms the portion 53 of the confinement could be made of a material which is capable of carrying a lower stress than the surrounding area of the confinement. Such material would have to be selected so as to stretch upon inflation of the confinement to form a bulge similar to the bulge A illustrated in the drawing. The membrane stresses in the bulge would be significantly lower than in the surrounding material, as described above, with similar advantages.

Having described our invention, we claim:

1. A vehicle safety apparatus comprising a confinement having a collapsed inoperative condition and an expanded operative condition for restraining movement of an occupant of a vehicle during a collision, said confinement when expanded having a substantially uniform fluid pressure throughout, said confinement having one portion engageable with the head of the occupant and a second portion engageable with the torso of the occupant, and means enabling said one portion of said confinement to apply a lower restraining force to a given mass impacting said confinement with a given force than said second portion thereof.

2. A vehicle safety apparatus as defined in claim 1 wherein said restraining force applied to the mass by said one portion is one-fourth to three-fourths the restraining force applied to the mass by said second portion.

3. A vehicle safety apparatus as defined in claim 1 wherein said one portion of said confinement is defined when said confinement is in a collapsed condition by boundaries and said means enabling said one portion of the confinement to apply said lower restraining force comprises material defining said one portion and in excess of the area defined by said boundaries.

4. A vehicle safety apparatus as defined in claim 3 wherein when said confinement is expanded said excess material provides a bulged portion of said confinement.

5. A vehicle safety apparatus as defined in claim 1 wherein said means enabling said one portion of said confinement to apply a lower restraining force comprises a pleated portion of material defining said one portion of said confinement.

6. A vehicle safety apparatus as defined in claim 1 wherein said means enabling said one portion of said confinement to apply a lower restraining force comprises material forming said one portion and being capable of carrying lower stress than the surrounding material.

7. A vehicle safety apparatus as defined in claim 6 wherein said first portion of said confinement is operable to apply a restraining force to a given mass impacting said confinement with a given force which is one-fourth to three-fourths the restraining force applied to the given mass by said second portion of said confinement.

8. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout, said confinement having a first portion engageable with the head of the occupant and a second portion engageable with the torso of the occupant, and means operable to maintain the membrane stress in said first portion of said confinement substantially lower than the membrane stress in said second portion of said confinement when said confinement is expanded to thereby enable said first portion of said confinement to exert a lower restraining force on a given mass impacting said confinement with a given force than said second portion thereof.

9. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout and a first portion operable to restrain the head of an occupant and a second portion operable to restrain the torso of the occupant, said first portion being defined by peripheral boundaries and including material that extends between said boundaries, said material extending between said boundaries having a surface area that is larger than the area defined by said boundaries to provide an excess of material between said boundaries when said confinement is expanded, said excess material thereby reducing the membrane stress in said first portion of said confinement when said confinement is expanded to enable said first portion of said confinement to exert a lower restraining force to a given mass impacting said confinement with a given force than said portion thereof.

10. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout, said confinement having a first portion engageable with the head of the occupant and a second portion engageable with the torso of the occupant, and means operable to maintain the membrane stress in said first portion of said confinement substantially lower than the membrane stress in said second portion of said confinement including pleated material defining said first portion of said confinement.

11. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout, said confinement having a first portion engageable with the head of the occupant and a second portion engageable with the torso of the occupant, and means operable to maintain the membrane stress in said first portion of said confinement substantially lower than the membrane stress in said second portion of said confinement, said last-stated means comprising material forming said first portion and being capable of carrying lower stress than the surrounding material.

12. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout and a first portion operable to restrain the head of an occupant and a second portion operable to restrain the torso of the occupant, said first portion when the confinement is collapsed being defined by peripheral boundaries and including material that extends between said boundaries, said material extending between said boundaries having an area that is larger than the area defined by said boundaries to provide an excess of material between said boundaries, said excess material minimizing the membrane stress in said first portion of said confinement when said confinement is expanded wherein said first portion of said confinement is operable to apply a lower restraining force to a given mass impacting said confinement with a given force than said second portion of said confinement.

13. A vehicle safety apparatus as defined in claim 12 wherein said material is pleated to provide said excess material on said first portion of said confinement.

14. A vehicle safety apparatus as defined in claim 13 wherein said confinement is made of a pair of side panels and said pleated material extends therebetween, said pleated material being folded to provide said pleats and secured to said side panels.

15. A vehicle safety apparatus comprising a confinement having a collapsed inoperative condition and an expanded operative condition for restraining movement of an occupant during the occurrence of a collision, means for expanding said confinement by directing fluid therein, said confinement when expanded having a substantially uniform pressure throughout and a first surface portion operable to restrain the head of an occupant and a second surface portion operable to restrain the torso of the occupant, said first surface portion defined by peripheral boundaries and including material that extends between said boundaries, said material extending between said boundaries having a surface area greater than the area defined by said boundaries to provide an excess of confinement material between said boundaries, said excess material reducing the membrane stress in said first surface portion of said confinement when said confinement is expanded whereby said first surface portion of said confinement is operable to apply a lower restraining force to a given mass impacting said confinement with a given force than said second surface portion of said confinement.